Oct. 20, 1964      R. E. JOHNSON      3,153,496

SYRINGE

Filed Nov. 20, 1961

INVENTOR.
Royce E. Johnson
BY *Wolfe, Hubbard, Voit & Osann*

ATTORNEYS

United States Patent Office 3,153,496
Patented Oct. 20, 1964

3,153,496
SYRINGE
Royce E. Johnson, Rockford, Ill., assignor to Barber-Colman Company, Rockford, Ill., a corporation of Illinois
Filed Nov. 20, 1961, Ser. No. 153,488
4 Claims. (Cl. 222—386)

This invention relates primarily to hypodermic-type syringes, and more particularly to syringes adapted to discharge an accurately measured minute quantity of fluid in the microliter range.

Hypodermic-type syringes have been extensively employed in scientific fields where quantitative and qualitative analyses of various fluid mixtures are necessary. One such field to which the present invention is particularly, but not exclusively, adapted is gas chromatography.

In many such applications a very small but precisely measured quantity of a sample liquid to be analyzed, normally a few microliters or less, must be quickly injected through a septum into a vaporizing chamber by means of a hypodermic-type syringe. A desirably simple type of syringe currently used in chromatograph and other scientific applications has a cylindrical barrel with a very small diameter axial bore. A needle is affixed at one end of the barrel and a plunger having a relatively long thin stem adapted to slide in the bore of the barrel with minimum blowby, is inserted at the other end. By providing a very small bore in the barrel, very small quantities of fluid may be accurately dispensed, and by fitting the plunger with minimum clearance in the bore, "blowby" or escape of the liquid being ejected past the plunger is minimized.

Due to the resulting high ratio of the length of the plunger to the diameter thereof, which is often greater than 150 to 1, and the small clearance between the bore and needle, which creates some resistance to movement, the plunger tends to bend as it is forced into the bore, and readily takes on a permanent "set" or deflection which renders its movement in the bore of the barrel very difficult and eventually impossible. The problem is, of course, amplified in certain applications where it is necessary to eject the contents of the bore very quickly, because of the additional force necessarily applied to the plunger to obtain the desired rapid response. Since syringes of such small and precise dimensions are seldom economically constructed of interchangeable parts, the syringe life is often very short. External guide rods and fittings have sometimes been employed to prevent creation of bending movements, but the added paraphernalia is a departure from convenient simplicity.

It is a particular object of the present invention to provide an improved syringe of the character described above for dispensing measured liquid quantities in the microliter range incorporating a very simple and convenient guide means for preventing bending damage to the syringe plunger.

The foregoing objects and advantages, as well as numerous others, will become more apparent from the following detailed description, when read in conjunction with the appended drawings, wherein.

Figure 1:
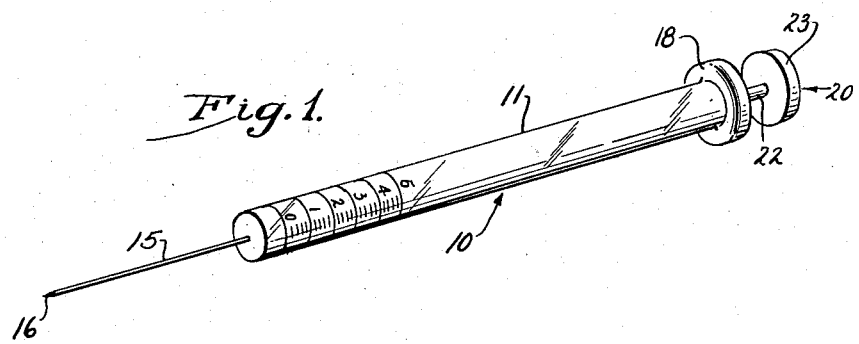
FIGURE 1 is a pictorial representation of a syringe embodying the present invention.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Figure 2:
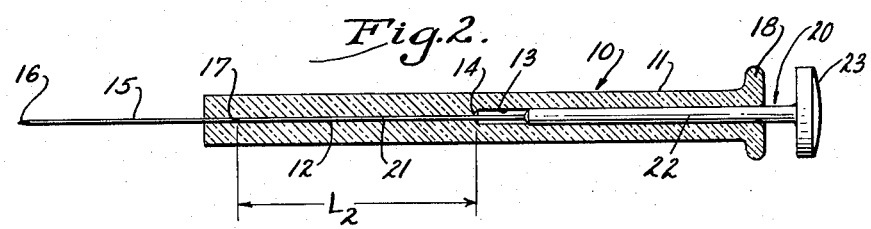
FIG. 2 is a longitudinal sectional view through the barrel showing also the stem of the improved hypodermic-type syringe fully inserted in the barrel.

Referring now to FIGS. 1 and 2, the preferred embodiment of the invention is shown as a hypodermic-type syringe 10, having a body or barrel portion 11 conveniently cylindrical in shape. The barrel is formed of a durable, impervious material not subject to attack by the fluid to be dispensed, and is preferably made of clear glass. A small diameter axial bore 12, which forms a fluid receiving and dispensing chamber, extends along approximately half of the length of the barrel coaxially with a substantially larger bore 13, extending along its remainder. A comparatively short tapered transitional zone 14 is provided between the two bores. The small bore, which is also the fluid measuring portion, accommodates a hollow needle 15 at one end, the needle being suitably cemented in place. The outer end of the needle is beveled or otherwise shaped to define a point 16 for insertion through a septum or other barrier, such as for hypodermic injections.

The volume scale is marked on the barrel, the zero reference point preferably being the inner end 17 of the needle 15. By this arrangement, the end 17 of the needle received in the barrel can be used as a defined limit position of the syringe plunger to be described. With a circular bore 12 of approximately 0.02 inch in diameter in a syringe constructed in accordance with this description, a 5 microliter scale, for example, extends for a distance of approximately one inch. The diameter of the small bore is desirably very accurately maintained along its length in the interest of accurate calibration. The larger bore portion, however, is employed primarily as a guide, and accurate size control is less necessary. Means for holding the barrel at the end opposite the needle is defined in this instance by a radial flange 18, which is conveniently formed at the plunger receiving end of the barrel when the glass is in plastic condition.

Figure 3:
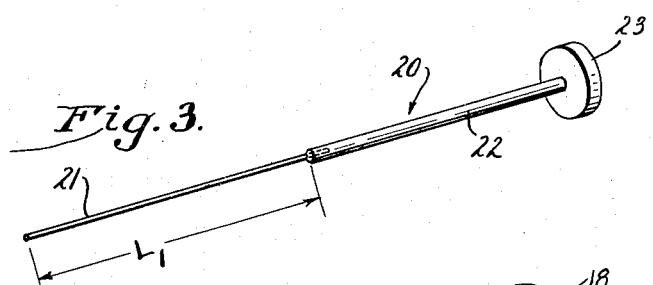
FIG. 3 illustrates the actuator of the syringe shown in perspective.

An actuator 20 is received within the barrel 11, as shown in FIGS. 1 and 2, and is further shown in FIG. 3. Approximately half of the actuator length comprises a relatively small diameter plunger 21 which fits closely within the small bore 12 of the barrel, the clearance or difference in diameter being preferably no more than approximately 0.0002 inch so that very little of the fluid can escape along the length of the plunger when the plunger is moved in the bore against a fluid column. The remaining length of the actuator comprises a relatively large diameter guide portion 22 which slides relatively freely within the large bore 13 of the barrel. A knob or suitable enlarged head 23 at the end of guide portion 22 enables the actuator to be pushed by thumb or finger pressure. Due to the greatly increased resistance to bending moments which characterizes the present actuator construction, the size of the head may be increased to a diameter of approximately three-fourths of an inch for the convenience of the operator. The actuator may be suitably turned from a single piece of stainless steel rod stock with the head soldered or mechanically fastened to it. The plunger and guide portions 21 and 22 may also be lengths of different diameter stock fastened together.

To facilitate operation, the length of the plunger $L_1$ (FIG. 3) matches or slightly exceeds the length $L_2$ of the small barrel bore portion 21 between the inner end of the needle and the large bore (FIG. 2). In order that optimum benefit may be derived from the guide portion, the plunger length $L_1$ is preferably also somewhat less than the length of the large bore 13 of the barrel. Thus, when the actuator and barrel are being assembled, the guide portion will engage the large bore and act as a guide to help align the plunger and small bore prior to their engagement. Any remaining minor misalignment is taken up by the tapered transitional section which guides the end of the plunger into the bore. These relative dimensions are not critical but it can be appreciated that the very small diameter plungers and their very close fits in these bores make precautions to avoid against bending of the plunger very desirable.

In operation of the apparatus illustrated by FIGS. 1, 2, and 3, it will be appreciated that the relatively stiff guide portion 22 of the actuator aligns the plunger for axial movement and prevents creation in the plunger of bending movements. In usual operation the barrel 11 is held between the fingers of the operators's hand and the operator's thumb pushes the actuator head 23 towards the large end 13 of the barrel to dispense the fluid previously drawn into the small bore of the barrel. The dispensing stroke in certain applications for which the present construction is adapted, is necessarily rapid for applications where nearly instantaneous ejection of all the contained fluid is required. Since the large diameter or guide portion of the actuator will have already entered the cooperating large portion of the barrel at the beginning of the operating stroke, the small diameter plunger 21 is held in axial alignment with the small bore and bending movements exerted on the actuator are easily resisted by the guide without transfer to the easily bent small diameter portion.

Figure 4:
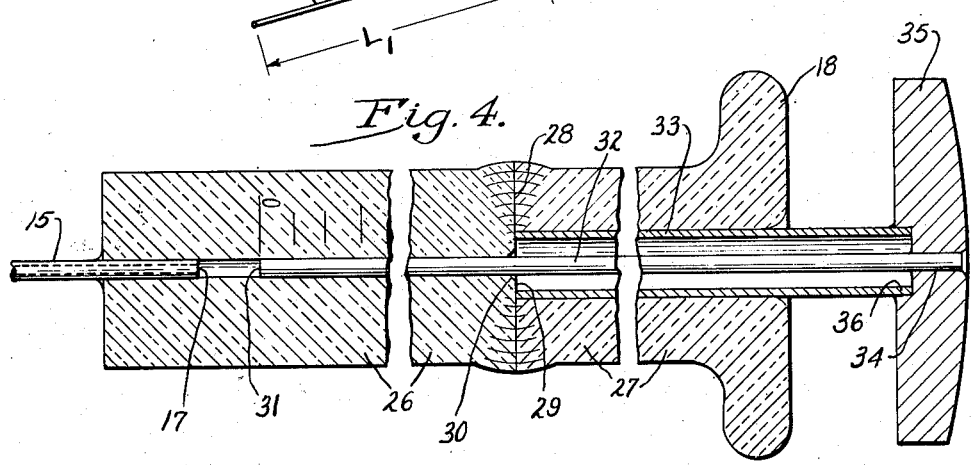
FIG. 4 illustrates a modification of the syringe of FIGS. 1 and 2.

A modification of the syringe is illustrated in FIG. 4 in which the syringe barrel is suitably fused from two glass cylinders, the left-hand section 26 bearing the small diameter plunger bore and the right-hand section 27 bearing the larger bore for the actuator guide. The enlarged diameter barrel portion 27 at the fusion plane 28 is raised to a greater or lesser degree, depending upon the steps of care and precautions in fusing the glass ends together. A very sharp internal shoulder 29 at the step change from the large diameter to the small diameter bore is thus provided as a positive stop to define the actuator limit position. A slight taper 30 is provided at the mouth of the small diameter bore to facilitate guiding the end 31 of the plunger into the bore. In such an instance the end 31 of the plunger need not meet the inner end 17 of the needle. As indicated in FIG. 4, the calibration markings on the barrel for a "0" reference point may be appropriately adjusted so as to align with the farthest travel of the plunger in the bore, as determined by the stop.

An actuator useful in the syringe of FIGS. 1 and 2, and particularly adapted for the FIG. 4 modification, is further shown in FIG. 4. For this construction plunger 32 extends for the length of the actuator. A portion of its length being within a tubular member 33 serves as the guide portion of the plunger. The end of the tubular member 33 is preferably flat to abut against the shoulder 29 at the end of the barrel portion 26 and precisely define the actuator limit position. The inner diameter of the tubular guide 33 is also larger than the outer diameter of the plunger 32 to allow a slight play or lateral displacement to accommodate any lack of concentricity of the larger and smaller bores of the barrel portions 26 and 27. This slight permissible deviation from axial alignment is offset in this case by the relief of the plunger from reaction forces at the end of the plunger stroke.

While the actuator assembly may be alternatively made from one piece without provision for play, it will be appreciated that in such a case a very high degree of concentricity of the bores or, correspondingly, a greater amount of clearance for the guide portion of the actuator, will be required to prevent binding or pinching of the plunger near the shoulder at the limit position.

As further shown in FIG. 4, the small diameter plunger member 32 suitably is fitted into a bore 34 in the actuator knob or handle 35 and secured thereto. The guide tube 33 is suitably soldered or otherwise fastened at its end 36 to the end member 35.

I claim as my invention:

1. In a hypodermic-type syringe, the combination comprising a barrel, including a small diameter bore section and a large diameter bore section coaxially disposed in said barrel, a tapered transitional section defined between said sections, a hollow needle secured in said barrel adjacent and axially aligned with said small diameter section, and a metallic actuator comprising a head, a relatively small diameter cylindrical rod defining a plunger mounted to said head, and a relatively large diameter tubular member defining a guide section for said plunger, said guide section being mounted with said head and extending coaxially with said plunger for a portion of the length thereof, said plunger having limited freedom to flex within said guide section, the diameters of said guide section and said plunger being only slightly less than the diameters of said large and small diameter bores, respectively, for providing a close-fitting relation therebetween when said actuator is slidably received in said barrel member.

2. In a hypodermic-type syringe, the combination comprising a barrel having a small diameter bore and an adjacent larger diameter bore longitudinally disposed therein, and a shoulder defined between them, a hollow needle secured in said barrel adjacent to and in axial alignment with one end of said small bore, an actuator member having a head, means defining a small diameter plunger extending axially therefrom, and a large diameter cylindrical guide section coaxially disposed radially outwardly of a portion of said plunger adjacent said head, said plunger having limited freedom to flex within said guide section, said plunger and said guide section being of slightly lesser diameter than said small and large bores, respectively, said guide section being adapted to define, in cooperation with said shoulder, a limit position of said actuator in said barrel when said actuator is received therein.

3. In a hypodermic-type syringe, the combination comprising a barrel having a small diameter bore and an adjacent larger diameter bore longitudinally disposed therein, a hollow needle having one end thereof secured in an end of said small bore, and an actuator member having a head, a small diameter plunger extending axially therefrom, and a larger diameter cylinder guide section coaxially disposed about a portion of said plunger adjacent said head such that said plunger has limited freedom to flex within said guide section, said plunger and said guide section being of slightly lesser diameter than said small and large bores, respectively, and the length of said plunger being less than the length of said guide bore such that said guide section enters said large diameter bore prior to the introduction of said plunger into said small diameter bore so that said plunger is guided into said small diameter bore without damage thereto.

4. In a hypodermic-type syringe, the combination comprising a barrel having a small diameter bore and an adjacent larger diameter bore longitudinally disposed therein, a hollow needle having one end thereof secured in an end of said small bore, and an actuator member having a head, small diameter plunger extending axially therefrom, and a larger diameter cylinder guide section coaxially disposed about a portion of said plunger adjacent said head such that said plunger has limited freedom to flex within said guide section, said plunger and said guide section being of slightly lesser diameter than said small and large bores, respectively, said guide section being received in said large diameter bore for guiding said plunger into said small diameter bore as said actuator is fitted into said barrel.

References Cited in the file of this patent

UNITED STATES PATENTS

| | | |
|---|---|---|
| 827,693 | Korb | July 31, 1906 |
| 2,380,534 | Lockhart | July 31, 1945 |
| 2,572,155 | Hoyt | Oct. 23, 1951 |
| 2,933,087 | Hamilton | Apr. 19, 1960 |

FOREIGN PATENTS

| | | |
|---|---|---|
| 365,912 | Germany | Dec. 23, 1922 |